Figure 27:
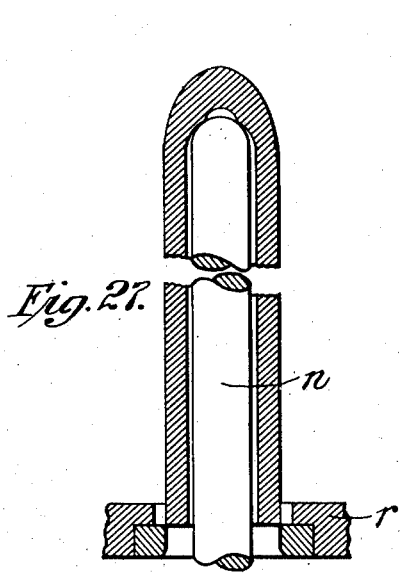

R. A. HADFIELD, A. G. MacK. JACK AND A. B. H. CLERKE.
MANUFACTURE OF GUN TUBES AND LIKE TUBULAR BODIES
APPLICATION FILED MAR. 28, 1918.
1,365,987. Patented Jan. 18, 1921.
7 SHEETS—SHEET 1.
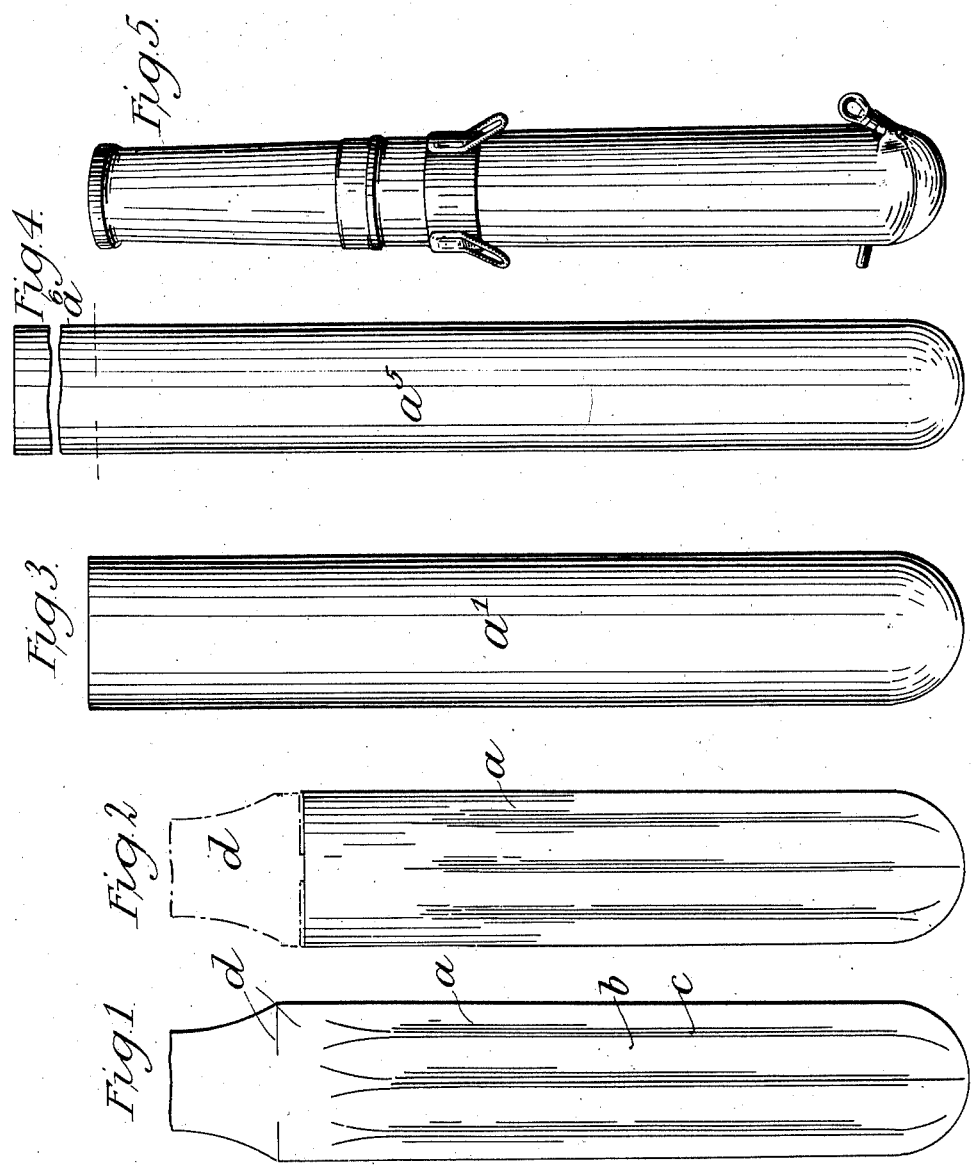
Inventors
Robert A Hadfield
Alexander G. M. Jack
Augustus B. H. Clerke
By. Alfred Wilkinson
Attorney

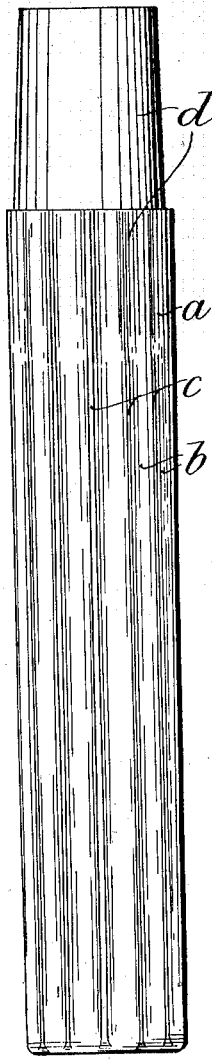
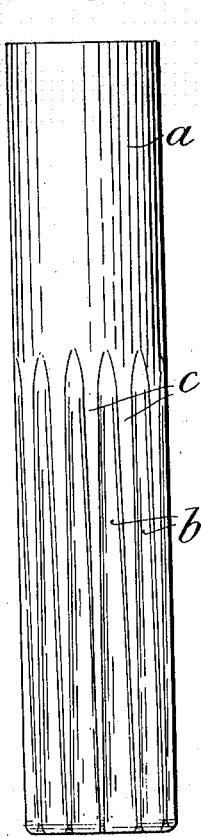
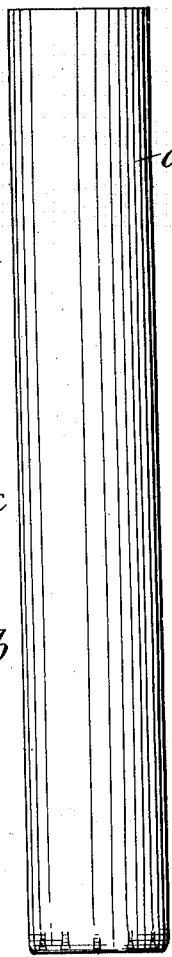
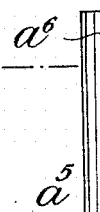
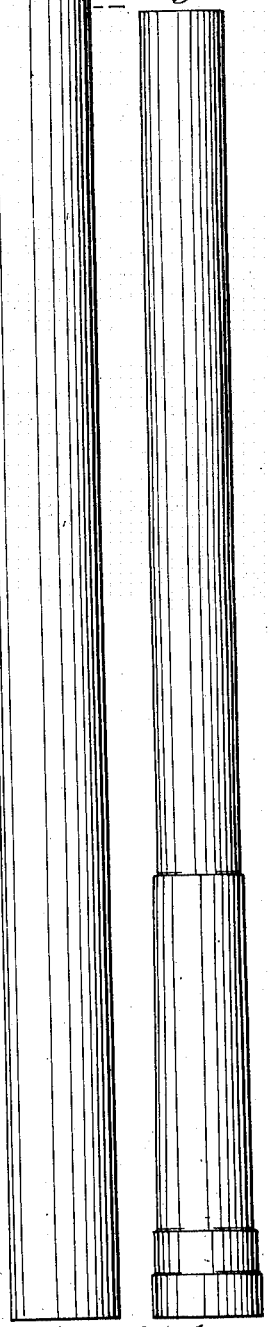

R. A. HADFIELD, A. G. MacK. JACK AND A. B. H. CLERKE.
MANUFACTURE OF GUN TUBES AND LIKE TUBULAR BODIES
APPLICATION FILED MAR. 28, 1918.
1,365,987.
Patented Jan. 18, 1921.
7 SHEETS—SHEET 3.
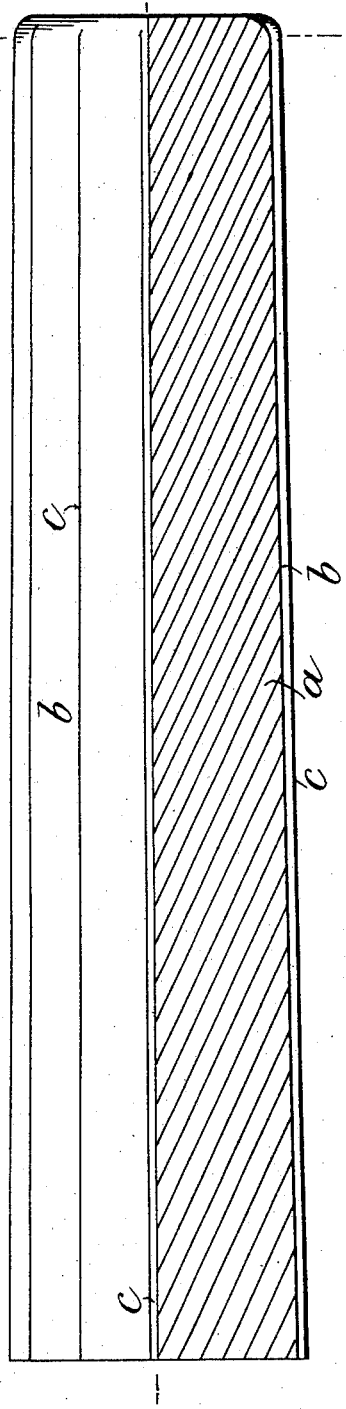
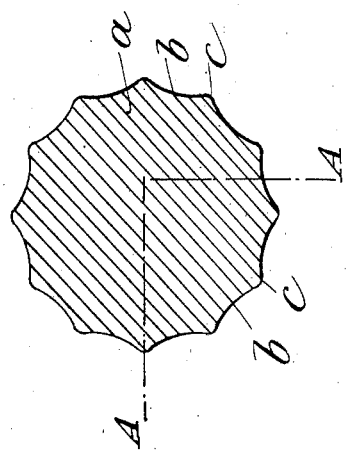
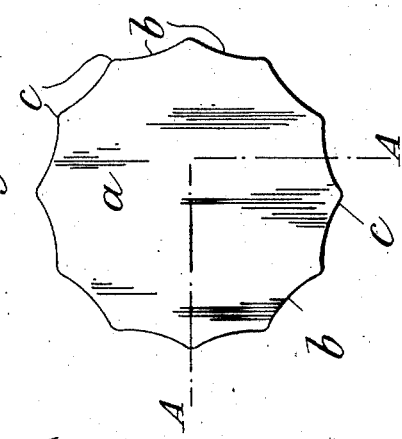
Inventors:
Robert A. Hadfield
Alexander G. M. Jack.
Augustus B. H. Clerke
By Alfred Wilkinson
Attorney

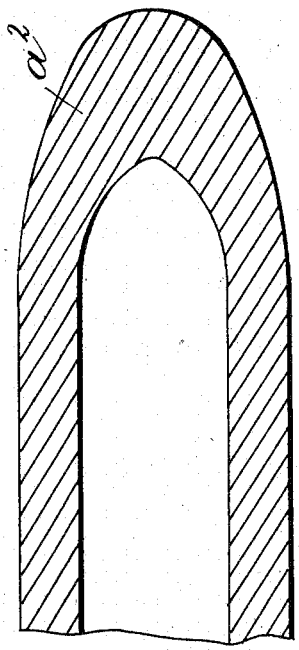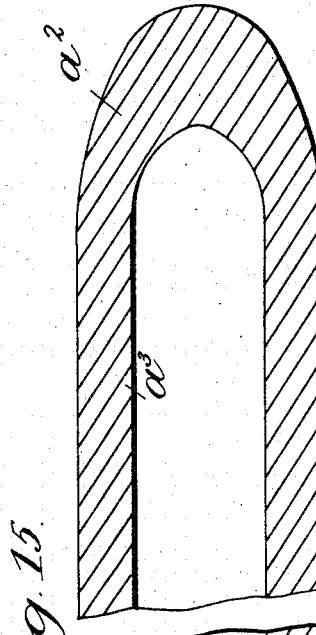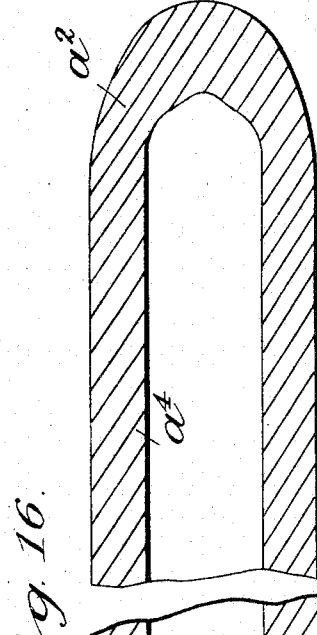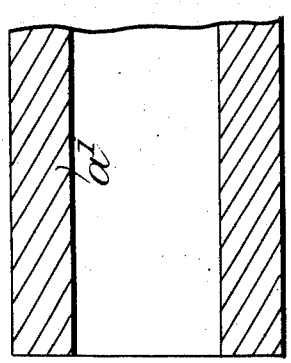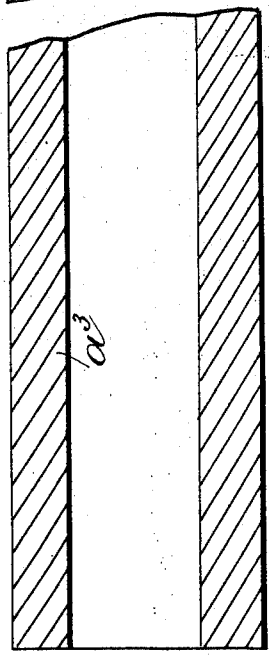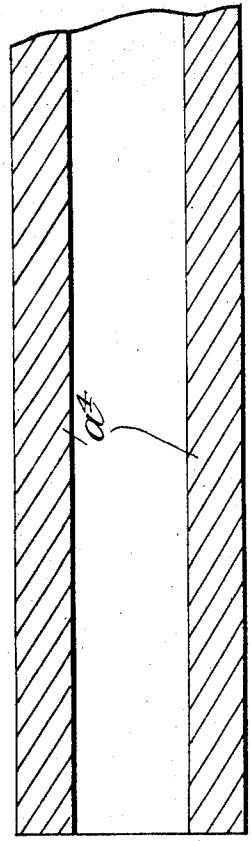

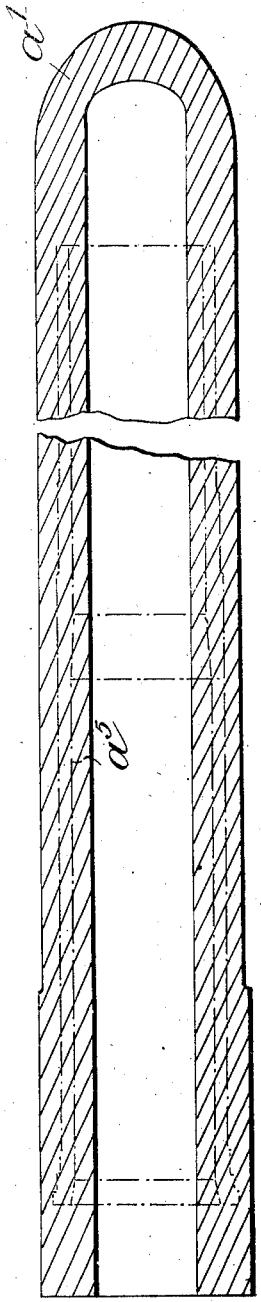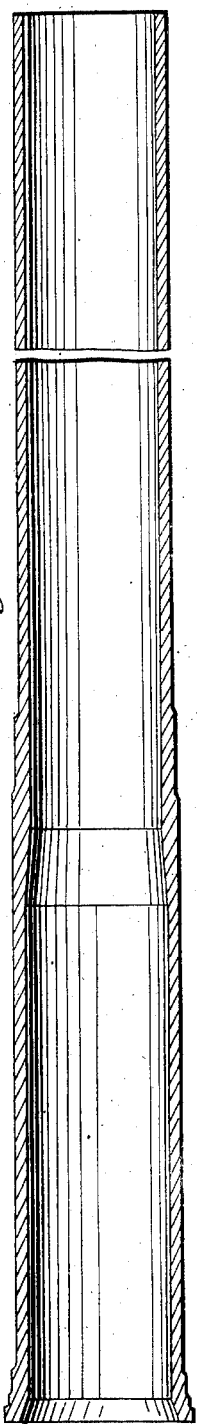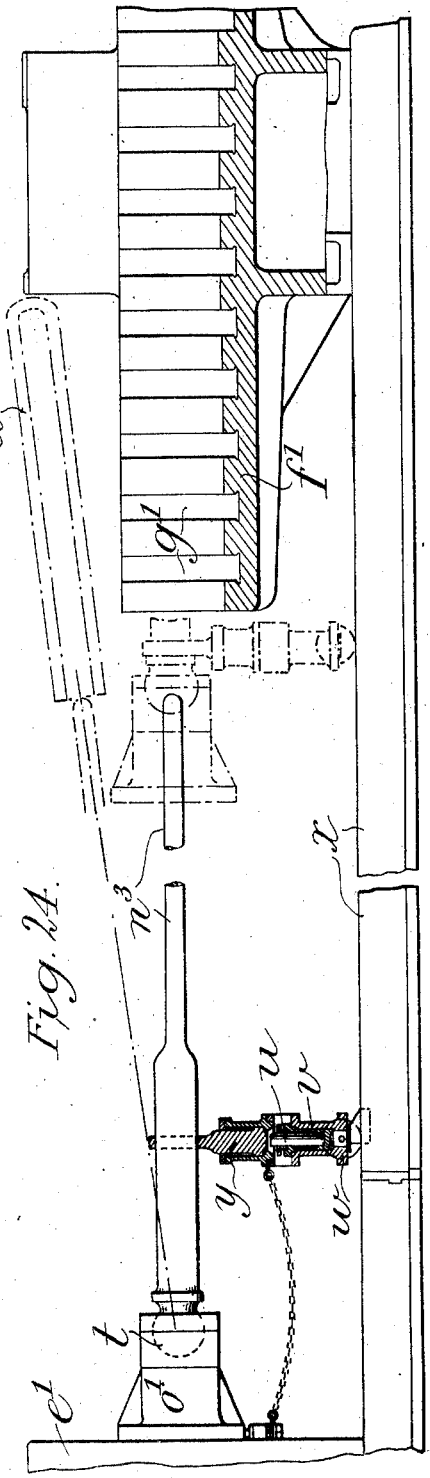

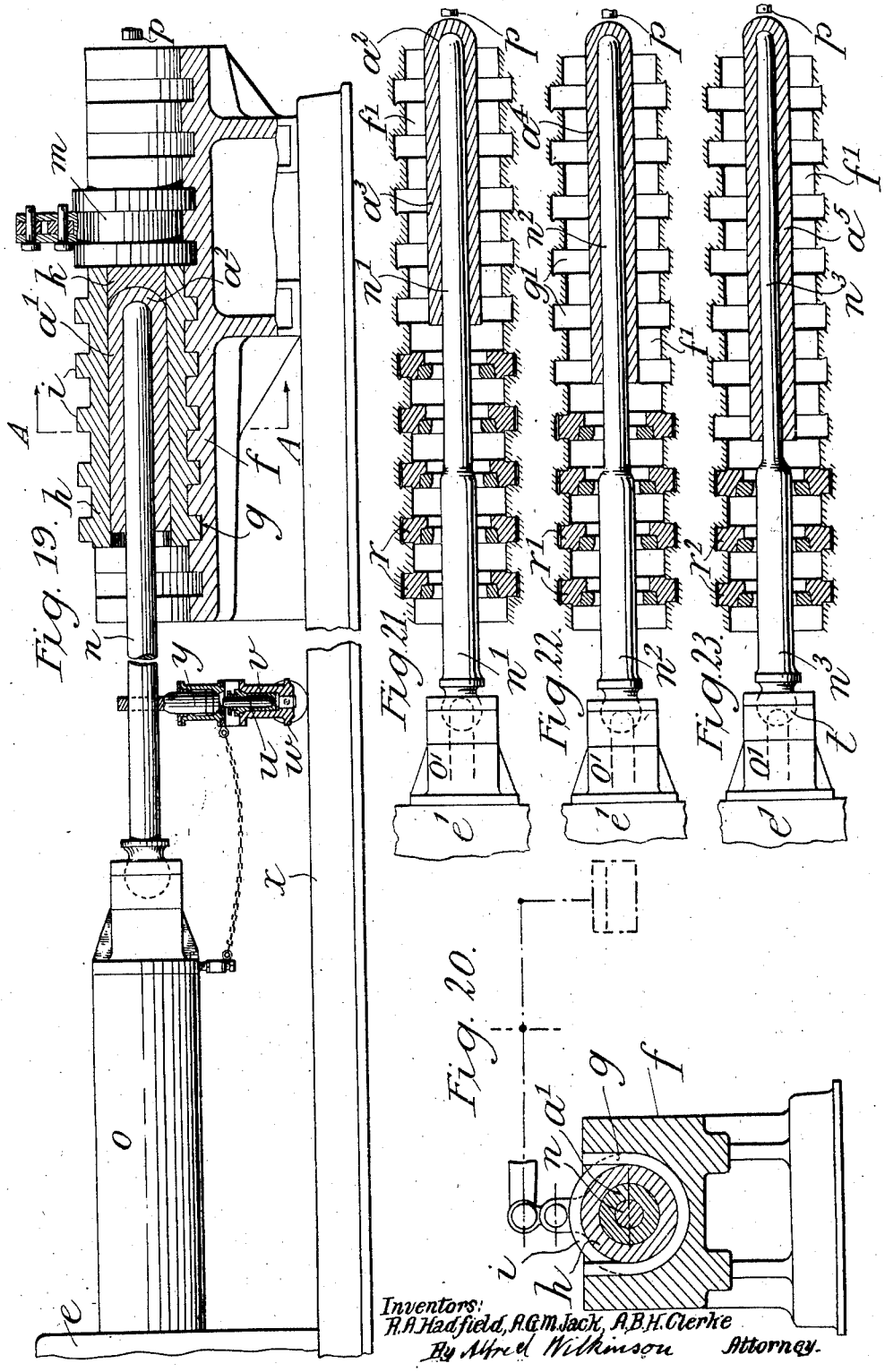

UNITED STATES PATENT OFFICE.

ROBERT ABBOTT HADFIELD, OF WESTMINSTER, AND ALEXANDER GEORGE MacKENZIE JACK AND AUGUSTUS BASIL HOLT CLERKE, OF SHEFFIELD, ENGLAND.

MANUFACTURE OF GUN-TUBES AND LIKE TUBULAR BODIES.

1,365,987.  Specification of Letters Patent.  Patented Jan. 18, 1921.

Application filed March 28, 1918. Serial No. 225,172.

*To all whom it may concern:*

Be it known that we, ROBERT ABBOTT HADFIELD and ALEXANDER GEORGE MACKENZIE JACK and AUGUSTUS BASIL HOLT CLERKE, subjects of the King of Great Britain and Ireland, residing, respectively, at the city of Westminster, England, Sheffield, in the county of York, England, and Sheffield, in the county of York, England, have invented Improvements in the Manufacture of Gun-Tubes and like Tubular Bodies, of which the following is a specification.

This invention has reference to the manufacture of gun tubes, suitable for use in the construction of howitzers and like guns and also for use as linings for heavier and longer guns, such for example as wire-wound or built up guns, in such a manner that they can be easily and quickly made without the use of a steam hammer, hydraulic hammer, rolling mill or forge, so as thereby to effect not only a great reduction in the cost of production of such gun tubes but also considerable saving in time of production, and enabling engineering works unprovided with plant of the kind referred to, to be quickly adapted for the manufacture of such gun tubes, features of great practical and national importance under the present war conditions.

According to the invention, a gun tube is produced by casting a steel ingot of suitable diameter and length to provide sufficient metal for the required finished gun tube then, after allowing it to cool and removing the head or discard therefrom, subjecting the resulting blank or billet while at a suitable temperature to a hollow extrusion process consisting in piercing a central hole in it by means of a punch while it is supported externally and at one end within a matrix or container (hereinafter called the matrix) having a cylindrical interior of the same diameter as the external diameter of the blank or billet so that the blank or billet being unable to expand radially to a greater diameter than that of the interior of the matrix, when subjected to the piercing action of the punch, is constrained to flow lengthwise between the punch and the matrix, the diameter of the punch, the internal diameter of the matrix and the travel of the punch being such as to produce a hollow extruded blank or billet (hereinafter called for distinction the extruded blank) closed at one end and of materially greater length than the original blank or billet from which it was made. The extruded blank thus made from the cast ingot is then subjected to successive drawing operations by forcing it through draw dies or sets of draw dies of successively decreasing diameter by successive mandrels each of materially smaller diameter than the internal diameter of the extruded blank and of the partly formed drawn gun tube made therefrom, except, it may be, the mandrel used for effecting the final drawing, so that the extruded blank and also the partly formed gun tube is, while it is being passed through the dies, except, it may be in making a special form as hereinafter described, the finishing die or set of dies, and is exposed to the constricting action of such dies, free to contract in diameter internally, with the result that the external and internal diameters of the extruded blank and of the partly drawn gun tube, are both reduced simultaneously with elongation of the tube as a whole. In this way the maximum amount of useful work can be done on the metal of the extruded blank and drawn gun tube and this work will be evenly distributed all around the metal under treatment.

In order to prevent each drawing mandrel pushing its way through the closed end or base of the heated extruded blank and gun tube during drawing, the closed base end of the blank and of the gun tube is cooled by a suitable cooling medium preparatory to commencing each drawing operation. For this purpose the base may be cooled by directing a jet of water upon it for a suitable time, depending upon the mass of metal in such end.

It is important that the form of the inner end of the bore or hole in the forging, forming the seat for the drawing mandrel, should be more steeply arched than the head or forward end of the mandrel so that the latter will center itself in the solid end of the core during the drawing operation. This applies to the successive drawing mandrels used, the head of each being of a more flattened form than the seat into which it takes. If the bore and seat of the extruded blank first produced should be found to be eccentric to the exterior of the blank, the said blank should, after cooling, be machined, as in a lathe to make the several parts mentioned concentric to one another before subjecting it to the drawing operations. The extruded blank is then reheated to a suitable drawing temperature and drawn through dies to form it into a gun tube of the required length and external diameter, the tube being reheated prior to the successive passes through the dies as is usual in tube drawing processes.

The finally drawn gun tube is then cut to length, rough turned and bored to approximately the required finished dimensions to form a howitzer or like gun, or, if it is to be used as a lining for a gun, its closed end is cut off. The gun or gun tube is afterward subjected to a suitable heat treatment such as hereinafter described, to impart to the metal of which it is composed the desired mechanical properties to adapt it for practical use. The gun tube is finally machined to the required finished dimensions.

In carrying out the invention the cast steel ingot from which the gun tube is produced may advantageously be made with a longitudinally grooved exterior surface, the grooves being of concave shape and of gradually increasing radial depth as they proceed from the upper to the lower portion of the ingot, with the outer edges or surfaces of the ridges between the grooves parallel, or nearly so, to the axis of the ingot and of rounded or convex shape.

Such a grooved formation of the exterior of the ingot results in the production, in effect, of a taper ingot having a cooling surface that is very large in area at the lower portion of the ingot and gradually decreases in area in the upward direction. By this means, after casting such an ingot, the molten metal will solidify quickly at the bottom and more slowly in an upward direction, so that molten metal at the top can descend and compensate for shrinkage of metal due to cooling and other causes and prevent the formation of blow holes, pipes and the like, with the result that an ingot of sound homogeneous steel, which is very essential in the production of reliable gun tubes, is obtained. Owing to the outer edges or surfaces of the ridges being parallel or nearly parallel to the axis of the ingot, the blank or billet obtained by removal of the head and discard of the ingot, can be readily centered in a true manner in the extrusion matrix in which it is placed preparatory to being simultaneously pierced and extruded, so that the hole formed in the resulting extruded blank shall be concentric with the exterior of the blank. The longitudinal grooves in the blank or billet are gradually eliminated to a greater or less extent by radial flow of the metal, during the punching and extrusion of the blank or billet or during this process and the subsequent drawing of the resulting extruded blank into a gun tube.

The dies used for drawing the extruded blank into a gun tube may advantageously be made of cast iron with the internal face chilled, and be of the usual flared shape. With this form of die the extruded billet and partly formed gun tube can be reduced in diameter to the extent at least of about .625 inch at each pass.

Gun tubes produced as described can be made from steel of various kinds, as for instance, carbon steel, nickel steel or nickel chromium steel and be heat treated in various ways to specially adapt them for use.

In order that the invention may be more readily understood it will now be further described with the aid of the accompanying drawings with reference to the manufacture of a trench howitzer or like gun and to the manufacture of a gun tube suitable for use as a lining for an ordinary wire-wound gun of greater strength and length than a howitzer or like gun.

In these drawings, Figure 1 shows, by way of example, a longitudinally grooved cast steel ingot of the kind herein referred to. Fig. 2 shows the ingot after the removal of its head or discard portion, shown in dot and dash lines, to form a solid blank or billet. Fig. 3 shows the hollow extruded blank produced by extrusion of the solid blank or billet and Fig. 4 shows the gun tube obtained by drawing the extruded blank. Fig. 5 shows a finished muzzle loading trench howitzer, say a 6 inch howitzer, after the drawn gun tube, shown in Fig. 4, has been roughly machined to shape, heat treated and finally machined to the required finished dimension and provided with external appliances to adapt it for use.

Figs. 6, 7, 8, 9 and 10 are similar views to Figs. 1, 2, 3, 4 and 5 respectively, showing, by way of example, a cast steel ingot and the successive stages in its conversion into a gun tube suitable for use as a lining for say a 9.2 inch breech loading howitzer gun.

Fig. 11 shows partly in plan and partly in longitudinal section on the line A A of Figs. 12 and 13, a longitudinally grooved blank or billet ready for extrusion. Figs. 12 and 13 are respectively left and right hand end views of the blank or billet shown in Fig. 11. Fig. 14 shows in longitudinal vertical section the extruded blank produced by subjecting the blank or billet shown in Figs. 11, 12 and 13 to the simultaneous piercing and extrusion process. Figs. 15, 16 and 17 show the successive results of subjecting the extruded blank to three successive drawing operations. Fig. 18 shows in longitudinal section, a gun tube produced by cutting the drawn gun tube shown in Fig. 17 to length and boring and turning it to approximately the desired finished dimensions.

Figure 28:
Figure 25:
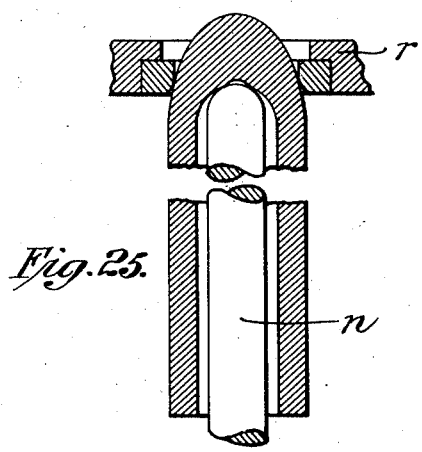
Figure 26:
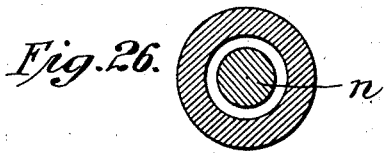
Figure 31:
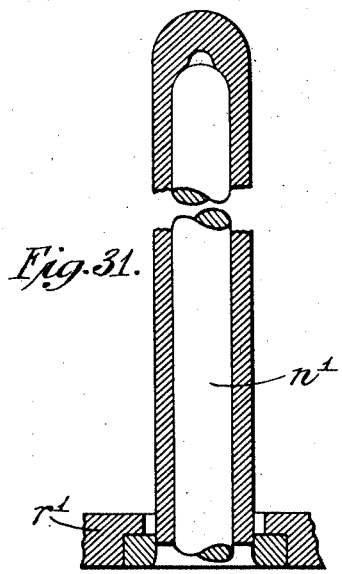
Figure 32:
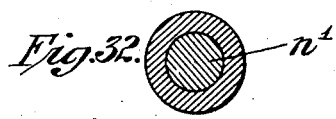
Figure 29:
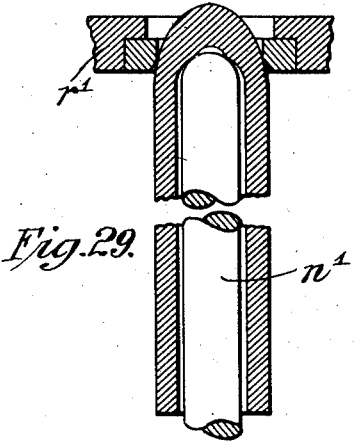
Figure 30:

Fig. 19 shows partly in side elevation and partly in section, and more or less diagrammatically, and to a smaller scale than the preceding figures, plant for simultaneously piercing and extruding a cast steel blank or billet, the resulting extruded blank being shown in longitudinal section. Fig. 20 is a cross section on the line A A of Fig. 19. Figs. 21, 22 and 23 are similar views to Fig. 19 showing the drawing plant and three stages in the conversion of the extruded blank into a gun tube. Fig. 24 shows the drawing plant in side elevation and how the mandrel used therein can be tilted upward to allow of the partly drawn gun tube being slipped on such mandrel before forcing it through a succeeding set of draw dies to complete its conversion into a gun tube, the mandrel in this figure being shown smaller than the internal diameter of the hollow blank. Figs. 25 to 32 are detailed views illustrating successive stages of the drawing operation more clearly to illustrate the provision of clearance between the dies and mandrels to permit of unobstructed inward working of the metal of the tube as it is reduced. Fig. 25 is a partial, longitudinal, sectional view illustrating an intermediate stage of the drawing operation showing the tube entering a die of one of the passes, and Fig. 26 is a vertical cross section through the die and mandrel of Fig. 25. Figs. 27 and 28 are similar views illustrating the tube or tube blank as fully reduced by said pass, and emerging from the final die thereof. Figs. 29 and 30 are longitudinal and sectional views corresponding to Figs. 25 and 26, illustrating the entry of the reduced blank, as it comes from the die of Fig. 27, into the foremost die of the finishing pass as illustrated in Fig. 23. Figs. 31 and 32 are views corresponding to Figs. 27 and 28 illustrating the complete tube as it emerges from the final reducing pass.

The following is a typical example of the manner and means adopted for producing a gun tube according to the invention.

A solid steel ingot $a$ (Fig. 1 or Fig. 6) is cast with a considerable number, say twelve, of longitudinal grooves $b$ of gradually increasing radial depth from the upper to the lower portion of the ingot and of concave shape in cross section, the intervening ribs $c$ having their outer surfaces of rounded shape and substantially but not quite parallel to the axis of the ingot as and for the purposes hereinbefore described, the overall shape of the ingot in end view being of a cylindrical character. The outer surfaces of the ribs, as cast, are not quite parallel to the axis of the ingot in order to provide sufficient taper to enable the ingot to be readily removed from its mold after casting. The grooves $b$ may extend part of the length of the ingot, the remaining portion of the ingot being of cylindrical shape, as in Fig. 1, or they may extend practically throughout the length of the ingot as in Fig. 6. The head or discard portion $d$ of the ingot is cut off and the remaining portion of the ingot roughly turned to the same diameter throughout to form a blank or billet (see Figs. 2 and 7) that will accurately fit the matrix of the extruding plant. This plant comprises a powerful hydraulic press $e$, a heavy stationary casting $f$ provided with a number of vertical grooves $g$ arranged parallel to one another, a cylindrical matrix $h$ having a number of external ribs $i$ adapted to fit the grooves $g$ in the casting $f$, an endwise removable plug $k$ having a concave end surface, a vertically movable end block or abutment $m$ fitted in the grooves $g$ so as to be firmly held in place endwise, a punch $n$ connected to the ram $o$ of the hydraulic press $e$ and a hydraulically operated pusher $p$.

Preparatory to piercing and extrusion, the blank or billet $a$ is heated to a suitable forging temperature, say for example to about 1200° C., if it is made of carbon steel, or say to about 1130° C. if made of nickel steel or nickel chromium steel. It is then placed in the matrix $h$ and against the plug $k$ supported by the abutment $m$, the internal diameter of the matrix being equal to that of the blank $a$. The punch $n$, which is of a diameter considerably greater than the internal diameter of the finished gun tube required, is then forced endwise into the blank or billet $a$ and the displaced metal caused to flow outward between the punch and the matrix, the inner end of the blank or billet being forced into the concave recess in the adjacent end of the plug $k$ and the travel of the punch being limited to form a closed end $a^2$ of any desired thickness to the hollow extruded blank $a^1$ thus formed by the combined piercing and extrusion process. The punch $n$ is then drawn back, the block or abutment $m$ and plug $k$ removed and the extruded blank $a$ pushed out of the matrix $h$ by the pusher $p$. Fig. 14 shows to a larger scale, an extruded blank thus produced.

The extruded blank thus obtained is then subjected to the drawing process to convert it into a gun tube. The plant used for this purpose comprises as shown in Figs. 21, 22 and 23, a hydraulic press $e^1$, a stationary casting $f^1$ formed with vertical grooves $g^1$, a set of draw dies $r$ adapted to fit the grooves $g^1$ in the casting $f^1$ and a mandrel $n^1$, connected to the ram $o^1$ of the hydraulic press $e$. The hydraulic press $e$ and casting $f$ with grooves (Figs. 19 and 20) used for the piercing and extrusion process, may also be afterward used for the drawing process, the matrix $h$ with plug $k$ and abutment block $m$ used for the former process, being replaced by the draw dies $r$ for the latter process.

For drawing the extruded blank $a^1$ into a gun tube, it is heated to a suitably high temperature, say for example, to about 1050° to 1200° C., then slipped over the drawing mandrel $n^1$ which is made of materially less diameter than the internal diameter of the extruded blank $a^1$ and then, after first cooling the closed end $a^2$ of the blank by a jet of water for the purpose hereinbefore mentioned, it is forced by the mandrel through the first set of draw dies $r$ (see Fig. 21). The partly formed gun tube $a^3$ (see Fig. 15) thus obtained is then reheated, its closed end cooled as before and then forced by another and smaller mandrel $n^2$ through a second set of dies $r^1$ (see Fig. 22). The partly formed gun tube $a^4$ thus obtained (see Fig. 16) is then reheated, its closed end cooled as before, and then forced by another and smaller mandrel $n^3$ through a third set of draw dies $r^2$ (see Fig. 23). Fig. 17 shows the resulting drawn gun tube $a^5$.

The mandrels $n^1$, $n^2$, $n^3$ used for the successive drawing operations are each materially smaller in diameter than the internal diameter of the extruded blank $a^1$ and partly drawn gun tube $a^3$, $a^4$, as and for the purpose hereinbefore explained. The forward end of each mandrel $n^1$, $n^2$, $n^3$ is made of a more flattened form than the seat $s$ in the extended blank $a^1$ (Fig. 14) and partly drawn gun tube, Figs. 15, 16 and 17, into which it takes, also as and for the purpose hereinbefore mentioned. The number of reheating and passes of the partly drawn gun tube through sets of dies will vary according to requirement. For a trench howitzer such as shown in Fig. 5, two passes may suffice. For a longer gun tube, such as shown in Figs. 10 and 18, three passes may suffice.

In carrying out the drawing operation, a drawing mandrel may be used which, instead of being rigidly fixed to the movable ram head $o^1$ of the drawing press, may, as shown in Fig. 24, be jointed to such head, as by a ball and socket joint $t$, so as to allow the extruded blank $a^1$, or partly drawn gun tube, when slipped over it, to center itself in the dies during the drawing operation. At the same time, this arrangement allows, with drawing apparatus of given length, a much longer extruded blank and gun tube to be dealt with than when the mandrel is rigidlly fixed to the ram head as usual. Such mandrel can, as shown in Fig. 24, be tilted upward by the ram $u$ of a small hydraulic cylinder $v$ mounted on a carriage $w$ arranged to run along the bed $x$ of the drawing apparatus, or by equivalent lifting means, into a position, indicated in dotted lines, to allow of the extruded blank, or partly formed gun tube $a^4$, being slipped endwise on to the mandrel clear of the dies $r$ and then lowered into position to allow of the extruded blank or partly drawn gun tube being pushed through the dies to effect the drawing operation. The head $y$ of the lifting ram $u$ or equivalent lifting means, may be adapted, as by forming it of a sufficient wide crutch shape, to allow of the mandrel being swung to one or other side of the center line of the press and dies when this may be desired.

In some cases the external diameter of one end of a gun tube may require to be larger than the remainder of the tube, or a tube with steps in its diameter may be required. In such cases the gun tube may not be allowed to pass entirely through the dies during some of the final draws but only to a sufficient extent as is necessary to produce the required result, the draw being stopped at the required point, the mandrel withdrawn and the gun tube pushed back through the dies, as by means of a hydraulic extractor ram, such as $p$ in Fig. 23, with the aid of suitable extension pieces. Or the required enlargement or steps may be left on the gun tube by suitably turning the drawn gun tube in a lathe.

For a trench howitzer, the drawn gun tube retains its closed breech end and is rough bored and turned approximately to the required finished dimensions (see Fig. 5). For a lining for a gun, the closed end of the gun tube is cut off and the tube rough bored and turned approximately to the required finished dimensions (see Figs. 10 and 18). The forward portion $a^6$ (Figs. 4 and 9) of the drawn gun tube which is cut off, can be used for testing purposes.

The gun tube thus produced and machined approximately to shape, is then subjected to heat treatment to impart the desired physical properties to it to adapt it for use. For this purpose the gun tube is heated to a high temperature and cooled by quenching it in a suitable cooling liquid, as for example oil or water. It is then reheated to a lower temperature than that of the first reheating and then cooled in water or in air or in the heating furnace. For example, if the gun tube is made of carbon steel containing say about .38% carbon, about .89% manganese and low in silicon, sulfur and phosphorus, it may advantageously be heated to about 900° C. and dipped vertically breech end first into oil, then reheated to about 640 to 660° C. and quenched in a similar manner in water, then reheated to about 670° to 680° C. and allowed to cool in air. In the case of a gun tube formed of nickel steel, containing say about .4% of carbon and 3.5% of nickel, it may be heated to 850° and quenched as described in oil and then reheated to 650° C. and quenched in water, or to 600° C. and allowed to cool in the furnace. In the case of a gun tube formed of nickel chromium steel containing say about .35 to .6% of carbon, about 3.5% of nickel and about .7% of chromium, it may be heated to about 850° C. then quenched in oil, then reheated to about 650° C., and quenched in water or it may be heated to about 640° to 650° C. and allowed to cool in the air, or it may be reheated to about 650° C. to 670° C. and allowed to cool in the air.

The heat treated gun tube is then machined to the desired final dimensions for use.

What we claim is:—

1. The method of producing gun tubes and like tubular bodies which consists in forcing a hollow blank having a closed end through dies by successive mandrels which act against the closed end only of the blank and are of substantially smaller diameter than the interior of the blank at the part thereof being acted upon by the dies at their smallest internal diameters so that the metal of the blank at these parts is unsupported internally and free to be moved radially inward simultaneously with elongation of the blank as a whole.

2. The method of producing gun tubes and like tubular bodies which consists in forming a hollow cylindrical blank closed at one end and having a substantially cylindrical bore of larger diameter than that of the required finished tubular body, heating the said blank, cooling its closed end, and forcing the blank through a die by a mandrel extending through the blank and acting at the closed end only thereof and of a diameter such that the metal of the blank, while it is being forced through the smallest part of the die and is exposed to the constricting action thereof, is free to move radially inward so that the external and internal diameters of the blank are both reduced simultaneously with elongation of the said blank as a whole.

3. The method of producing gun tubes and like tubular bodies which consists in forming a hollow cylindrical blank closed at one end and having a substantially cylindrical bore of larger diameter than that of the required finished tubular body, by piercing a solid metal blank supported externally and at one end so that the wall of the hollow blank is produced by extrusion of metal, heating the said blank, cooling its closed end and forcing the hollow blank through dies by mandrels of substantially smaller diameter than that of the interior of the hollow blank and acting against the closed end only of the blank, so that the metal of the blank while it is being forced through the smallest part of the dies and is exposed to the constricting action thereof, is free to move radially inward simultaneously with elongation of the blank as a whole.

4. The method of producing a gun tube, liner, howitzer or the like, which consists in producing a cast metal blank of substantially the same overall diameter throughout its length, placing the blank in a die of substantially the same diameter internally, piercing the ingot centrally and subjecting the hollow extruded blank thus formed and while in a heated condition to the action of dies through which it is forced by mandrels of substantially smaller diameters than the internal diameter of the blank, so that the metal of the blank is caused to move simultaneously in radially inward and longitudinal directions while passing through the smallest part of the dies.

5. The method of producing a gun tube, liner, howitzer or the like, which consists in producing a solid metal blank having longitudinal ribs the outer edges of which are substantially equidistant from the axis of the blank throughout their length, placing the blank in a die of substantially the same diameter as the blank across its ribs and closed at one end, piercing the ingot centrally to cause the metal thereof to flow radially outward to fit the interior of the die and simultaneously to flow longitudinally forward, and subjecting the extruded hollow blank thus formed and while in a heated condition to the action of mandrels and dies in such manner that the metal is unsupported internally in the plane of greatest constriction by the dies so that it is free to be displaced radially in an inward direction to reduce the internal and external diameters of the tube simultaneously with elongation of the tube as a whole.

6. The method of producing gun tubes, liners, howitzers, etc., which consists of forming an ingot with longitudinal tapering grooves but whose diameter is substantially the same throughout its length, placing the ingot in a matrix of substantially the same diameter, piercing the ingot centrally, and subjecting the blank thus formed to the action of mandrels and dies so that the metal is radially displaced to elongate the tube and reduce its internal and external diameters.

7. The method of manufacturing a gun tube or the like which, consists in placing a solid cast steel blank in a heated condition within a die closed at one end, piercing the blank centrally and thereby causing the metal of the blank to flow longitudinally between the die and punch to form a hollow extruded blank of materially greater length than the said solid blank and closed at one end and forcing the said extruded blank while in a heated condition through successive dies by mandrels of materially less diameter than the internal diameter of the blank and acting against the closed inner end only of the blank so that the metal is free to flow radially inward during such operation while the blank is being elongated as a whole.

8. The method of manufacturing a gun tube or the like direct from a solid cast steel blank of substantially the same overall diameter throughout its length by placing the blank in a die of substantially the same diameter, piercing the blank centrally, while heated, to form a hollow extruded blank closed at one end and of materially greater length than the solid blank and forcing the extruded blank, while heated, through successive draw dies by mandrels of materially smaller diameter than the internal diameter of the extruded blank and applied to the closed inner end only of the said blank so that the metal wall of the blank is reduced in diameter both externally and internally simultaneously with the elongation of the blank as a whole.

9. The method of manufacturing a gun tube or the like which consists in forming a solid cast steel externally ribbed blank, supporting the said blank centrally within a die of cylindrical shape internally and closed at one end, piercing the said blank centrally while in a heated condition and thereby causing the metal thereof to flow radially outward and longitudinally forward between the die and punch to form a hollow extruded cylindrical blank of materially greater length than the said solid blank and closed at one end, reheating the said blank, cooling its closed end and forcing it through dies by successive mandrels applied to the closed inner end only of the blank and of substantially smaller diameter than the interior of the blank and thereby causing inward radial displacement of metal simultaneously with the constriction of the external diameter and elongation of the blank to form the desired gun tubes.

10. The method of manufacturing a gun tube or the like, which consists in forming a solid cast steel blank with longitudinal grooves in its periphery of concave form in cross section and with the edges of the ridges between the grooves of rounded shape and substantially parallel to the axis of the ingot, placing the said blank while at a forging temperature, within a die of the same diameter and closed at one end, centrally piercing the said blank to form a hollow cylindrical extruded blank closed at one end and of materially greater length than the solid blank operated upon and forcing said extruded blank while in a heated condition with its closed end in a cooled condition through successive dies by mandrels acting against the closed inner end only of the blank and of materially smaller diameter than the internal diameter of the blank for the purpose set forth.

11. The method of manufacturing a gun tube or the like, which consists in forming a solid cast steel blank of substantially the same overall diameter throughout its length, placing the said blank at a forging temperature centrally within a die closed at one end, piercing the blank centrally in a longitudinal direction to produce a hollow extruded blank closed at one end and of materially greater length than the blank or billet operated upon, and of cylindrical shape both externally and internally, forcing the extruded blank while heated and with its closed end in a cooled condition, through successive dies to form a gun tube of the desired length by mandrels of materially smaller diameter than the internal diameter of the blank and acting against the closed cooled end only of the blank, for the purpose herein set forth and subjecting the resulting gun tube to heat treatment to remove strains set up therein by the foregoing mechanical treatment and to impart desired physical characteristics to the said tube.

12. The method of manufacturing a gun tube or the like, which consists in forming a solid cast steel blank with longitudinal grooves in its periphery of gradually increasing radial depth toward one end and of concave shape in cross section with the edges of the ribs between the grooves of rounded shape and substantially parallel to the axis of the ingot, placing the said blank in a heated condition within a die of the same diameter as the blank and closed at one end, piercing the blank centrally to produce a hollow extruded blank of cylindrical shape both externally and internally and closed at one end and of materially greater length than the blank operated upon, forcing the extruded blank while heated and with its closed end in a cooled condition, through successive dies to form a gun tube of the desired length by mandrels of materially smaller diameter than the internal diameter of the blank being operated upon and acting against the closed cooled end only of the blank for the purpose herein set forth, and afterward subjecting the resulting gun tube to heat treatment consisting in heating it to a high temperature, then quenching it in a cooling liquid, then reheating it to a lower temperature than that to which it was first heated before quenching and cooling it.

13. The method of manufacturing a gun tube or the like from a nickel chromium steel blank according to claim 11, wherein the heat treatment of the resulting gun tube consists in heating the said tube to a temperature of from about 850° C. to 900° C., dipping it base end downward, into oil, to quench it, reheating it to a temperature of from about 640° C. to 680° C. and cooling it.

14. The method of manufacturing a gun tube or the like from a nickel chromium steel blank according to claim 11, wherein the heat treatment of the resulting gun tube consists in heating the said tube to about 850° C., dipping it base end downward, into oil, to quench it, reheating it to about 650° C. and quenching it, base end downward in water.

15. The method of producing gun tubes and like tubular bodies which consists in forcing a hollow blank having a closed end through dies by successive mandrels which act against the closed end only of the blank and are of substantially smaller diameter than the interior of the blank at the part thereof being acted upon by the dies at their smallest internal diameter so that the metal of the blank at these parts is unsupported internally and free to be moved radially inward simultaneously with elongation the bore of the blank at its inner end being formed with a curve of larger radius than the head or forward end of the mandrel whereby the latter will center itself with relation to the blank, substantially as described.

16. The method of producing gun tubes and like tubular bodies which consist in forming a hollow cylindrical blank closed at one end and having a substantially cylindrical bore of larger diameter than that of the required finished body, heating the said blank, cooling its closed end, and forcing the blank through a die by a mandrel extending through the blank and acting at the closed end only thereof and of a diameter such that the metal of the blank, while it is being forced through the smallest part of the die and is exposed to the constricting action thereof, is free to move radially inward so that the external and internal diameters of the blank are both reduced simultaneously with elongation of the said blank as a whole said blank having its bore at its inner end formed tapering with relation to head or forward end of the mandrel whereby the latter will center itself with relation to the blank, substantially as described.

17. The method of producing gun tubes and like tubular bodies which consists in forming a hollow cylindrical blank closed at one end and having a bore of larger diameter than that of the required finished tubular body and subsequently developing the blank to substantially finished form wholly by successive drawing operations under the action of externally acting dies only whereby the blank will be reduced to approximately finished form by constriction with the maximum degree of compressing working of the metal inwardly free of contact internally with a cooling surface substantially as described.

18. The method of producing gun tubes and like tubular bodies which consists in initially forming a hollow cylindrical blank closed at one end and having a substantially cylindrical bore of larger diameter than that of the required finished tubular body and developing the said blank to substantially finished form wholly by successive drawing operations under the action of externally acting dies by forcing the blank though the dies by a mandrel extending through the blank and engaging at the closed end only thereof and said mandrel being of such diameter that the metal of the tubular wall of the blank as it is reduced in diameter is free to move radially inward to the maximum degree free of cooling contact with the mandrel and free of compression between the mandrel and die substantially as described.

Signed at London by me, ROBERT ABBOTT HADFIELD, on the 20th day of February, 1918.

ROBERT ABBOTT HADFIELD.

Signed at the city of Sheffield by me, ALEXANDER GEORGE McKENZIE JACK, this 21st day of February, 1918.

ALEXANDER GEORGE MacKENZIE JACK.

Signed at London by me, AUGUSTUS BASIL HOLT CLERKE, on the 20th day of February, 1918.

AUGUSTUS BASIL HOLT CLERKE.

Witnesses as to the signatures of Robert Abbott Hadfield and Augustus Basil Holt Clerke:
   A. F. BARTLETT,
   H. PETER VENN.

Witness as to the signature of Alexander George MacKenzie Jack:
   B. T. BURDEKIN.